United States Patent
Drnevich et al.

(10) Patent No.: US 7,395,670 B1
(45) Date of Patent: Jul. 8, 2008

(54) GAS TURBINE FUEL PREPARATION AND INTRODUCTION METHOD

(75) Inventors: Raymond Francis Drnevich, Clarence Center, NY (US); Vasilis Papavassiliou, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 720 days.

(21) Appl. No.: 11/061,875

(22) Filed: Feb. 18, 2005

(51) Int. Cl.
*F02C 6/18* (2006.01)
(52) U.S. Cl. .............................. 60/780; 60/777; 60/772
(58) Field of Classification Search .................. 60/777, 60/780, 39.12, 723; 423/650–654; 252/372
See application file for complete search history.

(56) References Cited

U.S. PATENT DOCUMENTS

| | | | |
|---|---|---|---|
| 5,358,696 A * | 10/1994 | Jahnke | 423/650 |
| 5,459,994 A * | 10/1995 | Drnevich | 60/783 |
| 5,516,965 A | 5/1996 | Hershkowitz et al. | |
| 5,600,017 A | 2/1997 | Kiss et al. | |
| 6,295,838 B1 | 10/2001 | Shah et al. | |
| 2003/0073788 A1 | 4/2003 | Golden et al. | 526/72 |

FOREIGN PATENT DOCUMENTS

| | | |
|---|---|---|
| EP | 953806 | 11/1999 |
| WO | 9220963 | 11/1992 |

OTHER PUBLICATIONS

Huff et al., "Partial Oxidation of Alkanes Over Noble Metal Coated Monoliths", Catalysis Today 21 (1994) pp. 113-128.

Kramer et al., "Flexible Hydrogen Plant Utilizing Multiple Refinery Hydrocarbon Streams", NPRA Annual Meeting (1996) pp. 1-17.

Reyes et al., "Evolution Of Processes For Synthesis Gas Production: Recent Developments In An Old Technology", Ind. Eng. Chem. Res. 42 (2003) pp. 1588-1597.

Chlapik et al., "Alternative Lower Cost Feedstock For Hydrogen Production", NPRA Annual Meeting (2004) pp. 1-8.

* cited by examiner

*Primary Examiner*—Dmitry Suhol
*Assistant Examiner*—Gerald L Sung
(74) *Attorney, Agent, or Firm*—David M. Rosenblum (57) ABSTRACT

Method of preparing and introducing fuel into the combustors of a gas turbine in which a hydrocarbon containing feed, oxygen and steam are introduced into a catalytic partial oxidation reactor to produce a product stream. The hydrocarbon containing feed contains no less than about 15 percent by volume on a dry basis of hydrocarbons with at least two carbon atoms and/or at least about 3 percent by volume of olefins. The reactant mixture formed of the hydrocarbon containing feed, oxygen and steam has an oxygen to carbon ratio of between about 0.08 and about 0.25 and a water to carbon ratio of between about 0.05 to about 0.5. The hydrocarbon containing feed is introduced into the reactor alone or with a steam at a temperature no greater than 600° C. and the product stream is produced at a temperature of between about 600° C. and 860° C. and contains less than about 0.5 percent of olefins and less than 10 percent of hydrocarbons with two or more carbon atoms on a dry basis. After cooling the product stream the product stream is introduced into the combustors of the gas turbine to form part or all of the fuel required to support combustion.

14 Claims, 4 Drawing Sheets

GAS TURBINE FUEL PREPARATION AND INTRODUCTION METHOD

FIELD OF THE INVENTION

The present invention relates to a method of preparing and introducing fuel into combustors of a gas turbine. More particularly, the present invention relates to such a method in which a hydrocarbon containing feed stream is reacted with steam and oxygen in a catalytic partial oxidation reactor to reduce the heavy hydrocarbon content of such stream to acceptable levels prior to introduction into combustors of a gas turbine.

BACKGROUND OF THE INVENTION

Gas turbines are used in a variety of industrial settings to supply power to a load, generally an electrical generator. A gas turbine consists of a compressor to compress air and an expander to recover energy from the compressed air after having been heated. The compressed air is heated within a set of combustors located between the compressor and the expander.

Gas turbines are designed to burn a variety of fuels such as natural gas, liquefied petroleum gas and synthesis gases containing hydrogen and carbon monoxide as well as liquid fuels such as #2 fuel oil. Additionally, gases that are produced from steel production, such as blast furnace gases and coke oven gases are also utilized. Blast furnace gases are typically blended with other gases in that they do not have sufficient heating value to be used alone. Coke oven gases contain too much hydrogen to be used in connection with lean premix combustion systems.

Coke oven gases can be produced with a high content of hydrocarbons containing two or more carbon atoms or a high olefin content that can thermally crack and produce carbon deposits in gas turbine combustion components. While blending such gases will reduce the problems associated with thermal cracking, the degree to which such gases are blended also will act as a limitation on the utilization of such gases. There are other offgases produced in refineries, for instance, sweet refinery gases and fluidic catalytic cracker offgases that similarly contain a high content of hydrocarbons with two or more carbon atoms and have the potential for thermal cracking. Similar problems exist in using other types of offgases and byproducts produced in other chemical production facilities. A further problem is that the makeup of such gases can vary over time and as such, their use as gas turbine fuel can be highly problematical.

As will be discussed, the present invention provides a method in which fuels are pretreated at a catalytic partial oxidation reactor to lower the heavy hydrocarbon content of such gases, for example the hydrocarbons with two or more carbon atoms and/or unacceptably high olefin contents to acceptable levels so as to be utilized as a source of fuel for a gas turbine. Moreover, such treatment also dampens the effect of variability in the consistency of the hydrocarbon makeup of such gases.

SUMMARY OF THE INVENTION

The present invention provides a method of preparing and introducing fuel into combustors of the gas turbine. In accordance with the method, a hydrocarbon containing feed stream is introduced into a catalytic partial oxidation reactor along with an oxygen containing stream and a steam stream. The hydrocarbon containing feed stream comprises no less than about 15 percent by volume in a dry basis of hydrocarbons with at least two carbon atoms and/or at least about 3 percent by volume of olefins. The hydrocarbon feed stream, oxygen containing stream and steam stream are introduced into the catalytic partial oxidation reactor so that a reaction mixture is obtained, prior to contact with catalyst, having an oxygen to carbon ratio of between about 0.08 and about 0.25 and a water to carbon ratio of between about 0.05 and about 0.5.

The hydrocarbon containing feed stream is introduced into the catalytic reactor alone or in combination with a steam stream at a temperature of no greater than about 600° C. The reactant mixture is reacted within the catalytic partial oxidation reactor so that a product stream is produced at a temperature of between about 600° C. and about 860° C. The product stream has a hydrocarbon content consisting of methane, less than about 0.5 percent of olefins by volume on a dry basis, less than about 10 percent of alkanes with two or more carbon atoms on a dry basis and a remaining hydrocarbon content of less than about 1.0 percent by volume on a dry basis of hydrocarbons other than methane, alkanes and olefins. The remaining content of the product stream comprises hydrogen, carbon monoxide, carbon dioxide and water vapor. The product stream is then cooled and introduced into the combustors of the gas turbine so that the product stream constitutes at least part of the fuel required to support combustion within the combustors.

The fuel stream can be formed by combining the product stream, as a first fuel stream, with a second fuel stream to form a combined fuel stream and thereby to at least in part cool the product stream. The second fuel stream can be natural gas.

The hydrocarbon containing feed stream can be combined with the steam stream to form a combined stream. The combined stream is introduced into the catalytic partial oxidation reactor to form the reactant mixture. Heat can be indirectly transferred from the product stream to the combined stream, thereby to preheat the combined stream and to at least in part cool the product stream.

An air stream can be compressed to form the oxygen-containing stream. A makeup water stream can be pumped to form a pressurized water stream. The product stream is then quenched with the pressurized water stream.

The steam stream can be produced by pumping a makeup water stream to form a pressurized water stream. Heat is indirectly transferred from the product stream to the pressurized water stream within a heat exchanger. This cools the product stream and thus, forms the steam stream. Additionally an oxygen containing stream can be formed by compressing an air stream, thereby to form a compressed air stream. Heat is indirectly transferred from the product stream to the pressurized air stream. This preheats the compressed air stream and also cools the product stream. The air stream can be a bleed air stream from a compressor section of the gas turbine.

In any embodiment, the combustors can be lean premix combustors and each of the lean premix combustors can have a primary mixing zone for mixing fuel and compressor air to obtain a combustible mixture and a downstream secondary combustion zone for combusting the combustible mixture. Each of the lean premix combustors can have primary fuel nozzles for feeding a primary fuel stream, constituting part of the fuel, to the primary mixing zone and a secondary fuel nozzle for introducing a secondary fuel stream, constituting a remaining part of the fuel, into the secondary combustion zone and downstream of the primary fuel nozzles to ensure combustion stability. Where the hydrogen within the product stream is present in an amount that is at least about 10 percent by volume, the secondary fuel stream introduced by the secondary fuel nozzle can constitute the product stream. The product stream can be cooled by pumping a makeup water stream to form a pressurized water stream and quenching the product stream with the pressurized water stream. Heat may also be indirectly transferred from the product stream to the second fuel stream. The primary fuel stream can be natural gas.

In any embodiment the hydrocarbon containing feed stream can be an FCC offgas, a coker offgas, coke oven gas, or a sweet refinery gas.

BRIEF DESCRIPTION OF THE DRAWINGS

While the specification concludes with claims distinctly pointing out the subject matter that Applicants regard as their invention, it is believed that the invention would be better understood when taken in connection with the accompanying drawings in which:

DETAILED DESCRIPTION

Figure 1:
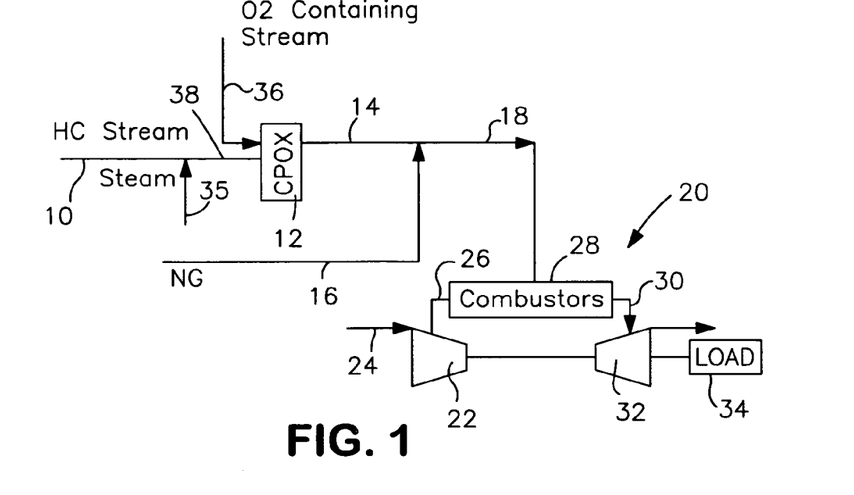
FIG. 1 is a schematic illustration of an apparatus for carrying out a method in accordance with the present invention.

With reference to FIG. 1 a hydrocarbon containing feed stream 10 ("HC Stream") is pretreated in a catalytic partial oxidation reactor 12 ("CPOX") to produce a product stream 14 that is combined with a natural gas stream 16 ("NG") or other fuel stream having a sufficient heating value, to form a fuel stream 18 that is introduced as fuel to a gas turbine 20.

Gas turbine 20 has a compression section 22 that can be a series of stages. Compressor section 22 compresses an air stream 24 to form a compressor air stream 26 that is heated by combustion of fuel stream 18 in combustors 28 to produce an exhaust stream 30. Exhaust stream 30 is introduced into a turbine section 32 that is connected to a load 35 that can be an electrical generator. Compressor section 22 and expander section 32 are mechanically coupled together. Combustors 28 can consist of combustors that are arranged around the compressor section 22 in a manner well known in the art. Expander 32 can be split into two independent sections. The first section is on the same shaft as compressor 22 and the second section is on a second shaft that is connected to load 34.

Hydrocarbon containing feed stream 10 has a hydrocarbon content of at least 15 percent by volume on a dry basis of hydrocarbons with two or more hydrocarbons and/or at least about 3 percent by volume of olefins. For example, such stream could be a refinery offgas such as a fluidic catalytic cracker offgas, a coker offgas or a sweet refinery gas. Coke oven gases having a high hydrocarbon content is another possibility. As mentioned above, such a feed is unsuitable as a fuel to gas turbine 20 because the hydrocarbon content has a high potential for carbon cracking. In order to reduce the aforesaid hydrocarbon content to acceptable levels, hydrocarbon containing feed stream 10 is introduced into catalytic partial oxidation reactor 12 along with a steam stream 35 and an oxygen containing stream 36 to form a reactant mixture within the catalytic partial oxidation reactor 12 that is in turn contacted with a catalyst. It is to be noted that hydrocarbon containing feed stream 10, steam stream 35 and oxygen containing stream are all at a sufficient pressure to allow for product stream 14 to be produced at a sufficient pressure for combination with natural gas stream 16 or for introduction alone into combustors 28.

Steam stream 35 is added at a rate of between about 0.05 to about 0.5 water to carbon ratio within the reactant mixture. The ratio of steam addition is important since it helps with reformation of the olefins and other hydrocarbons with more than two carbon atoms. Too much steam is undesirable because excessive steam will also lower the temperature within catalytic partial oxidation reactor 12 and thus, prevent the decomposition of the higher order hydrocarbons to methane, carbon monoxide, hydrogen and etc. In addition, excess steam will dilute the volumetric fuel content of the product stream.

Oxygen containing stream 36, which can be air, oxygen enriched air or other oxygen containing gas is added at a rate of between about 0.08 and about 0.25 oxygen to carbon ratio within the reactant mixture.

This can be done using a sparger or static mixer or reticulated metallic or ceramic foam monolith. The foam monolith provides a tortuous path that can provide safe and complete mixing of the oxygen at a relatively low pressure drop. The proportions of hydrocarbon, steam and oxygen can be controlled by controlling the flow rates of the aforementioned streams by, for example, by valves, not illustrated.

Hydrocarbon containing feed stream 10 and steam stream 35 are preferably combined to form a combined stream 38 that is introduced into catalytic partial oxidation reactor 12 at a temperature of no greater than 600° C. to prevent cracking of higher order hydrocarbons. As could be appreciated, the aforesaid streams could be introduced separately. Although not required, hydrocarbon containing feed stream 10 can be preheated to conserve oxygen. The temperature of the exit of catalytic partial oxidation reactor 12 is maintained at between about 600° C. and about 860° C. to preferentially reduce the content of olefins in the hydrocarbons with two or more carbon atoms to acceptable levels. At outlet temperatures below about 600° C. there is insufficient reactivity to reduce the olefin and heavy hydrocarbon content to acceptable levels. At outlet temperatures above about 860° C. there is too much oxygen or in other words, more than necessary and further, methane and other hydrocarbons will be oxidized to carbon oxides, hydrogen and water to reduce the heating value of product stream 14 and therefore, its usefulness as a fuel.

If the reaction takes place within the temperature limits discussed above and the feed conditions of the reactant mixture, the oxygen is totally consumed and the water is reduced to less than 15 percent by volume at the outlet of the partial oxidation reactor 12. Under such conditions, saturated hydrocarbons in the feed will react but at a slower rate than the olefins. The higher molecular weight of hydrocarbons with more than two carbon atoms are also converted into hydrogen, carbon monoxide, carbon dioxide and methane. At the reaction conditions specified, the product stream 14 will contain less than about 0.5 percent olefins by volume on a dry basis and less than about 10 percent by volume on a dry basis of alkanes with two or more carbon atoms. At such temperatures, other hydrocarbons may exist but in trace amounts and in any case less than about 1 percent by volume on a dry basis. The remaining content will comprise methane, hydrogen, carbon monoxide, carbon dioxide and water vapor. Such a treated product stream 14 is suitable for use in part or alone as a fuel for gas turbine 20.

Catalytic partial oxidation reactor 12 contains a partial oxidation catalyst which is preferably a metallic monolith coated with a catalytic layer that contains platinum, rhodium, palladium, nickel or ruthenium. The structure of the monolith can be reticulated foam, honeycomb or a corrugated foil wound in a spiral configuration. Catalyst coated ceramic beads or ceramic monoliths in the form of reticulated foam or honeycomb structure are other possibilities.

It is believed that the metallic supported catalyst has better performance than other supported catalysts in that it has better heat conductivity, a more uniform temperature profile than other catalyst forms and a lower operating temperature. All of these factors permit the more selective destruction of olefins without converting too much of the paraffins for instance, ethane, into olefins.

A useful catalyst can be obtained from Sud Chemie of Louisville, Ky., USA which is in the form of a monolith which is sold as PC-POX 1 on FECRALY. Experimental data has confirmed that space velocities of about 46,000 hours$^{-1}$ are effective for the reactive mixture with such catalyst to produce a product having olefin and other hydrocarbons with more than 2 carbon atom contents that are acceptable for use within a gas turbine. For such purposes, space velocity is defined as the ratio of the volumetric gas flow rate at standard temperature and pressure divided by the empty reactor value. Practically, longer residence time may be recorded and hence, space velocities of at least 10,000 hours$^{-1}$ may be required for certain feeds to be treated.

In order to operate any embodiment of the present invention, preliminary water to carbon and oxygen to carbon ratios and desired outlet temperatures to be obtained can be determined by known simulation techniques for a given feed. The makeup of the feed can be determined by gas chromatography. Finer adjustments to such ratios, feed rates and etc. can be made in the field by analysis of product stream 14. Such finer adjustments can involve sampling and analyzing product stream 14 using gas chromatography. Preferably, sufficient data can be developed so that performance could be predicted without analysis by gas chromatography. There are possible applications for the present invention in which product stream 14 is used as the sole fuel to the gas turbine 20. This would of course depend on its heating value and compatibility with the gas turbine combustor 28. In most cases, product stream 14 will be used as an adjunct and therefore, blended with another fuel stream, for instance natural gas stream 16. However, since potential coking hydrocarbons have been controlled to levels similar to those found in natural gas, such treated streams as product stream 14 can be used in greater amounts than contemplated in the prior art.

As mentioned above, gas turbines can be designed to run on process gases, such as coke oven gases, provided the heavier hydrocarbons are removed by scrubbing. High levels of higher molecular weight hydrocarbons, especially olefins, can form carbon within gas turbine combustors and result in erosion and fouling of gas turbine components and the emission of "smoke" in the gas turbine exhaust.

The amount of variation of the heating value for a given fuel system design is however limited. Fuel nozzles are designed to operate within a specific volumetric flow rates. Ranges in heating values can be accommodated by increasing or decreasing the fuel nozzle area or gas temperature. For an existing combustor designed for a fuel such as natural gas the fuel nozzle area is fixed. The temperature of the fuel can be adjusted to keep fuel stream 18 within the desire energy density for gas turbine control purposes. A measure of the inter-changeability of gas fuels for a given system design is the Wobbe Index. The Wobbe Index is equal to a ratio of the lower heating value of the fuel and the square root of a product of the specific gravity of the fuel relative to air and the temperature of the fuel. Typically, the fuel is supplied at a temperature that does not exceed plus or minus 5 percent of the Wobbe Index.

Therefore, in retrofit situations or situations in which the gas turbine is not modified, product stream 14 or a blend including product stream 14, for example fuel stream 18, is utilized in a manner to meet the design Wobbe Index of a particular gas turbine combustor. The degrees of freedom that will govern the use of product stream 14 are its composition and temperature and if blended, the composition and temperature of the blend or for example, fuel stream 18. In a situation in which product stream 14 is to be used alone, its temperature can be adjusted through heat exchange with reactant streams for catalytic partial oxidation reactor 12 and if necessary, by further cooling. In case of blending, further or the sole temperature control may be obtained by controlling flow rates of the product stream 14 and the other fuel stream, for instance, natural gas stream 16. The lower heating value of the blend can also be controlled by controlling flow rates.

In practice, the composition of the hydrocarbon containing feed stream 10 may vary to in turn vary the composition and temperature of product stream 14 and therefore any calculated Wobbe Index. As indicated above, if the composition and temperature of product stream 14 is controlled, then control of the blending of the streams is a simple and straight forward matter of controlling the flow rates of the two streams. In most operational situations the use of catalytic partial oxidation will dampen feed variations in that such a reaction preferably removes heavier hydrocarbons which are the most likely variables in the feed. Hence, generally, all that is required is to control the temperature of the blend once a blend ratio is selected by use of the turbine fuel preheat controls.

If further control is required due to variability in the composition of hydrocarbon containing feed stream 10, a finer degree of control can be obtained limiting the amount of product stream 14 that is blended with natural gas stream 16 to less than about ten percent. This of course may be the least desirable course of action. A more desirable control is to dampen feed variations by operating catalytic partial oxidation reactor 12 with a slightly higher oxygen to carbon ratio than the minimum required to maintain olefins at less than 0.5 percent and other hydrocarbons with more than two carbon atoms less than 10 percent. The excess oxygen for such purposes can be between about 10 percent and about 15 percent higher than the minimum amount required. This is sufficient to control a 20 to 30 percent increase in composition of a single component, for instance ethylene, in the feed gas.

In addition, it is important to control the quantity of fuel delivered to the gas turbine to match the fuel requirements for a given gas turbine operating condition. This can be accomplished by monitoring the composition of hydrocarbon containing stream 10, again by gas chromatography, and using the results of such monitoring to set the flow rate to match the gas turbine requirements. Such operation of the catalytic partial oxidation reactor 12 will essentially dampen feed variations so that they do not result in substantial differences in the Wobbe Index and the gas turbine fuel requirements can be consistently delivered.

A yet further strategy for controlling the reaction within catalytic partial oxidation reactor 12 in response to feed variations is to adjust the oxygen to carbon ratio and the steam to carbon ratio so that the exit temperature of catalytic partial oxidation reactor 12 is maintained within a very narrow window. Maintaining the temperature in a narrow window will result in a low variability of composition within product stream 14. Feed variation can result in more or less carbon being present in the hydrocarbon containing feed 10. If the carbon content in the hydrocarbon containing feed 10 increases, if for example, the feed ethylene concentration increases, and no corrective action is taken then the temperature of product stream 14 will decrease. The opposite will happen if the carbon content in hydrocarbon containing feed stream 10 decreases. Temperature variations will lead to composition fluctuations, which will effect the temperature and the heating value of the product stream 14 which will then be blended with turbine natural gas stream.

Practically, in order to maintain the steam to carbon and oxygen to carbon ratios constant, the flow rate of the hydrocarbon containing feed stream 10 can be controlled. For instance, if the carbon concentration of the feed increases, the flow of the hydrocarbon containing feed stream 10 can be decreased, for example, by a control valve, in order to keep the carbon to oxygen ratio and the steam to carbon ratio the same and ultimately the temperature of product stream 14 in the desired range. This action will counter the temperature decrease that the higher carbon feed concentration would have so that the temperature would remain within the narrow window. Maintaining the temperature within 5 to 15 degrees of a set point is sufficient. The set temperature point to be maintained is determined on a case by case basis since it will depend on the average composition of hydrocarbon containing feed stream 10 and as mentioned above will be between about 600° C. and about 860° C.

As can be appreciated by those skilled in the art, a combination of the different control schemes could be utilized. Further, such combination or any of the control schemes mentioned above could be manually implemented in that practically, feed variations occur over a sufficiently long period of time. Automated control is of course possible.

Figure 2:
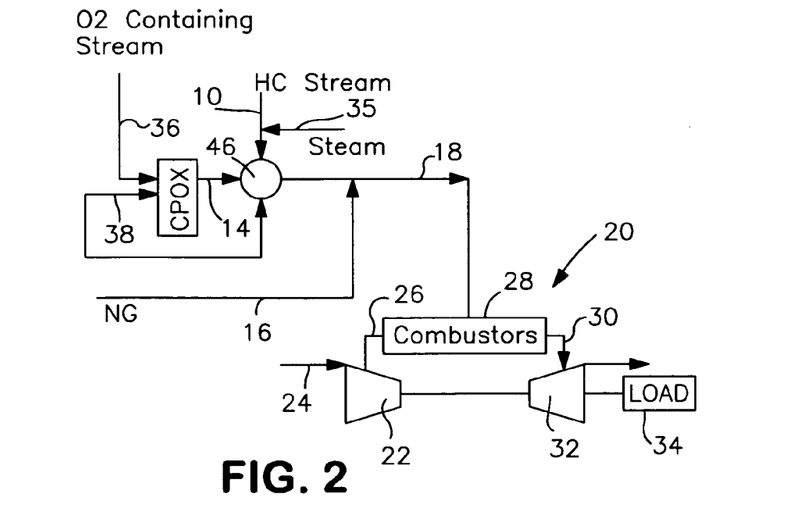
FIG. 2 is an alternative embodiment of an apparatus for carrying out a method in accordance with the present invention.

With reference to FIG. 2, an alternative embodiment of FIG. 1 is illustrated that has the advantage of preheating combined stream 38 while reducing the temperature of product stream 14 to acceptable levels and to help meet the Wobbe Index of the combustors 28 and thereby to enhance the degree to which product stream 14 can be utilized as makeup for fuel stream 18. As illustrated, a heat exchanger 46 preheats combined stream 38 while cooling product stream 14. The preheated combined stream 38 has the additional advantage of lowering the required oxygen usage to maintain reactor exit temperature and maintain the appropriate hydrocarbon content.

Figure 3:
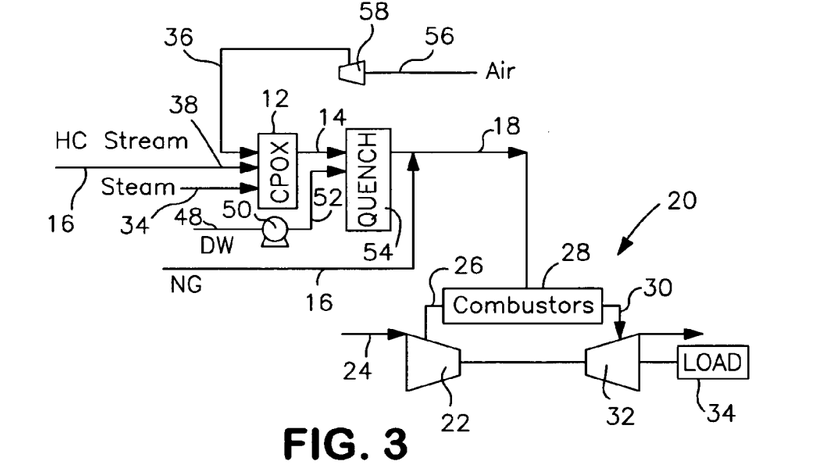
FIG. 3 is a schematic illustration of a further embodiment of an apparatus for carrying out a method in accordance with the present invention.

With reference to FIG. 3, an alternate temperature control is provided by pumping a makeup water stream 48 formed of de-ionized water ("DI") with a pump 50 to produce a pressurized stream 52 that is at a sufficient pressure to be introduced into a quench tower 54 ("Quench") along with product stream 14. As a result, product stream 14 will be at a lower temperature upon its combination with natural gas stream 16 and will contain water vapor that will tend to lower NOx emissions of gas turbine 20 and provide slightly more mass to be expanded in turbine section 32. The oxygen containing stream in this embodiment, as well as any embodiment, can be an air stream 56 that is compressed by a compressor 58 to produce a compressed air stream to serve as the oxygen containing stream 36. Oxygen containing stream 36 is introduced along with hydrocarbon containing feed stream 10 and steam stream 34 into catalytic partial oxidation reactor 12.

Compression of air stream 56 is required since, as indicated above, steam stream 34 and hydrocarbon containing feed stream 10 are obtained at pressure. Since the heat of compression is not removed from compressed air stream forming the oxygen containing stream 36, it can help supply heat to the reactant mixture to be consumed within catalytic partial oxidation reactor 12 to help reduce oxygen utilization.

Figure 4:
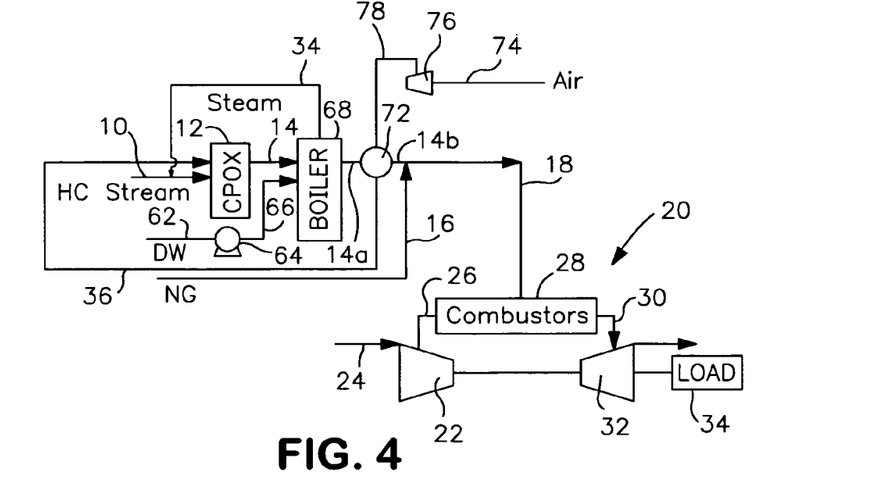
FIG. 4 is a schematic illustration of a yet further embodiment of an apparatus for carrying out a method in accordance with the present invention.

FIG. 4 illustrates an embodiment of the present invention in which a makeup water stream 62 is pumped by pump 64 to produce a pressurized stream 66 that is of a sufficient pressure that when introduced into a boiler 68 or other heat exchange device, steam stream 34 will be at a sufficient pressure to in turn be combined with hydrocarbon containing stream 10. The resulting combined stream 38 is introduced into catalytic partial oxidation reactor 12. Product stream 14 indirectly exchanges heat with pressurized stream 66 within boiler 68 to raise the steam and as a result cool to form a partly cooled product stream 14a. The partly cooled product stream 14a is then further cooled within heat exchanger 72 to produce a cooled product stream 14b that is combined with natural gas stream 16. At the same time, an air stream 74 is compressed by a compressor 76 to produce a compressed air stream 78 that is heated within heat exchanger 80 against the cooling of partly cooled product stream 14a to produce oxygen containing stream 36 that is heated and thereby can serve to heat the reactant mixture to be reacted within catalytic partial oxidation reactor 12.

Figure 5:
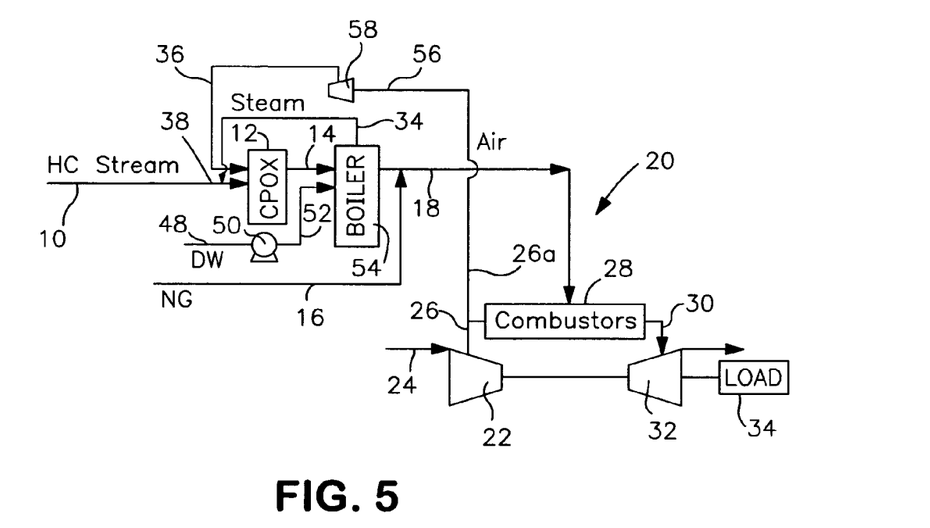
FIG. 5 is a schematic illustration of still, yet further embodiment of an apparatus for carrying out a method in accordance with the present invention.

FIG. 5 illustrates an alternative embodiment of FIG. 3 in which a bleed air stream 26a is extracted from compressor stream 26. Bleed air stream 26a is then further compressed by compressor 58 and introduced directly into catalytic partial oxidation reactor 12. This embodiment helps reduce the compression duty of the separate compression provided by compressor 58.

It is to be noted that the combustors 28 can be diffusion combustors or lean premix combustors also known as dry low NOx combustors. In diffusion combustors, the fuel/air mixing and combustion take place simultaneously in a primary combustion zone. In lean premix combustors the fuel and air are mixed in an initial or primary mixing stage. The resultant mixture is then fed into a secondary combustion stage where combustion takes place. There are a variety of known air and fuel staging techniques that are utilized in such combustors. Lean premix combustors are particularly sensitive to the hydrogen content and compositional variations of the fuel and the use of fuels with a hydrogen content at or above about ten percent by volume is problematical in such combustors.

Figure 6:
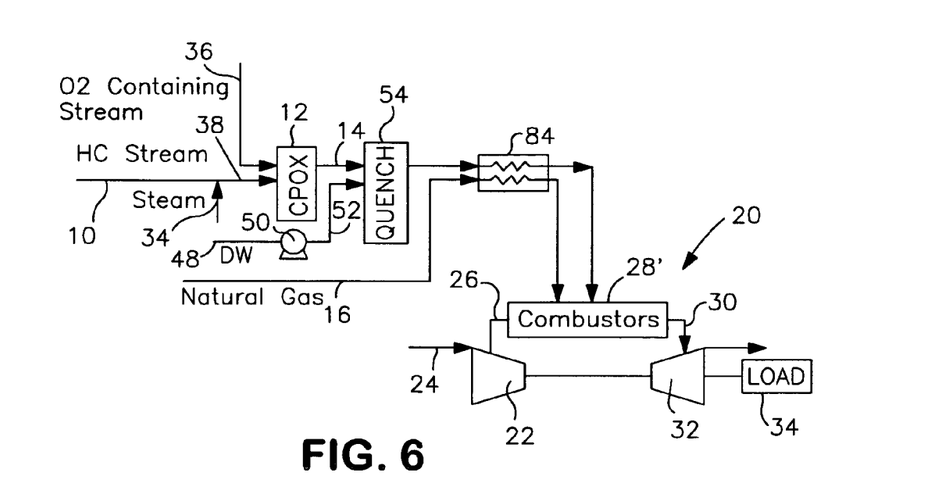
FIG. 6 is a schematic illustration of an embodiment of an apparatus for carrying out a method in accordance with the present invention that is connected with the use of a lean premix combustor.

With reference to FIG. 6, a further alternative embodiment is illustrated that is particularly suited for use with a lean premix combustor 28' where the hydrogen content of the product stream 14 is ten percent and greater. The illustrated embodiment is somewhat similar to that illustrated in FIG. 3 except that the natural gas stream 16 is co-currently passed through a heat exchanger 84 that acts to cool product stream 14 while warming natural gas stream 16. As will be further discussed, natural gas stream 16 and product stream 14 are separately fed to lean premix combustor 28'.

Figure 7:
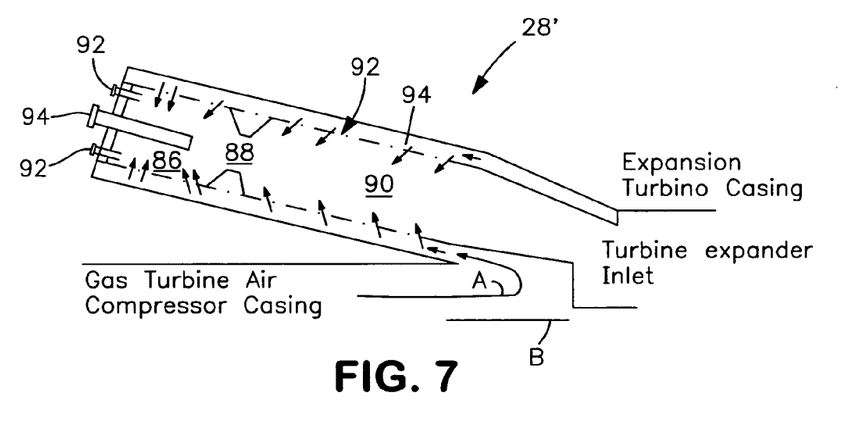
FIG. 7 is a schematic illustration of a lean premix combustor of the type that is schematically illustrated in FIG. 6.

With reference to FIG. 7, lean premix combustor 28' is provided with a primary mixing zone 86 in which air and fuel mix proportions that dilute the fuel. The fuel is combusted within a secondary combustion zone 88 and cooled within a cooling zone 90. Lean premix combustor 28' is provided with a combustion liner 92 having slots 94 for introduction of air in the direction of the arrowheads. Part of the compressed air stream 26 enters lean premix combustor 28' as a stream "A" and typically, another part "B" is used for cooling purposes. Natural gas stream 16 is introduced into the primary fuel nozzles 92. The product stream 14 is introduced into secondary fuel nozzle 94 where the hydrogen content of the stream is not particularly sensitive.

As mentioned above, combustors 28 could be lean premix combustors such as lean premix combustor 28' with parts of fuel stream 18 being introduced both into primary fuel nozzle 92 and secondary fuel nozzle 94. Furthermore even in a case of product stream 14 having an unsuitably high hydrogen content, at and above about ten percent, blending product stream 14 with natural gas stream 16 could lower the hydrogen content of fuel stream 18 on a volumetric basis to allow such a blended stream to be injected in both the primary and secondary fuel nozzles 92 and 94 respectively.

A calculated example was performed for a typical lean premix combustor designed to operate with a natural gas fuel at a gas temperature of about 204° C. This calculated example will be discussed with respect to the embodiment of the present invention illustrated in FIG. 2.

The natural gas composition is given in the Table set forth below. The catalytic partial oxidation reactor 12 was simulated as a Gibbs reactor. The Wobbe Index of the natural gas at 100° C. is about 45.625 calculated by conventional means. As indicated above, a gas turbine can accept as gas with a Wobbe Index within 5 percent of the design value or in the range of between about 43.343 and about 47.907 in case of natural gas at the aforesaid temperature.

In the example, hydrocarbon containing feed stream 10 is formed of a typical refinery offgas produced by a fluidic catalytic cracker. Hydrocarbon containing feed stream 10 has a composition given in the Table, set forth below, and a flow rate of about 25 percent of the natural gas stream 16 volumetric flow rate. Steam stream 34, having a flow rate of about 10 percent of hydrocarbon containing stream 10 volumetric flow rate and a temperature of about 250° C., is mixed with the hydrocarbon containing feed stream 10 to produce combined stream 38 which is in turn fed to catalytic partial oxidation reactor 12 that operates at a pressure of about 300 psig. An oxygen containing stream 36 of substantially pure oxygen which has a flow rate that is about 7 percent of hydrocarbon containing stream 10 volumetric flow rate and a temperature of about 21° C. is also introduced into catalytic partial oxidation reactor 12.

The temperature of the product stream 14 is calculated at 720° C. and has a composition also set forth in Table 1. Product stream 14 is cooled in heat exchanger 46 and mixed with natural gas stream 16 having a temperature of about 20° C. to produce the fuel stream 18 to be fed as fuel into combustors 28. The composition of the fuel stream 18 is listed in the far column of Table 1. Fuel stream 18 is controlled to a temperature of about 80° C., which would be above the condensation point for water in such stream and would possess a calculated Wobbe Index of 43.557, which is in the range of the natural gas Wobbe Index limits set forth above. As can be appreciated, such calculation could be used as a measure of the preliminary adjustment to the steam and oxygen to carbon ratios mentioned above.

TABLE

| | | Natural Gas Stream 16 | Hydrocarbon Containing Feed Stream 10 | Product Stream 14 | Fuel Stream 18 |
|---|---|---|---|---|---|
| Hydrogen | Mol % | 0 | 10.833 | 4.245 | 1.117 |
| Methane | mol % | 91.78 | 37.705 | 67.974 | 85.517 |
| Ethylene | mol % | 0 | 15.907 | 0.073 | 0.019 |
| Ethane | mol % | 3.42 | 15.509 | 0.203 | 2.574 |
| Propylene | mol % | 0 | 2.835 | 0.006 | 0.001 |
| Propane | mol % | 0.61 | 1.647 | 0.002 | 0.450 |
| Isobutane | mol % | 0.07 | 0.678 | 0 | 0.052 |
| n-Butane | mol % | 0.1 | 0.197 | 0 | 0.074 |
| 1-Butene | mol % | 0 | 0.15 | 0 | 0 |
| 1,3-Butadiene | mol % | 0 | 0.007 | 0 | 0 |
| Isopentane | mol % | 0 | 0.277 | 0 | 0 |
| Pentane | mol % | 0.05 | 0.836 | 0 | 0.037 |
| 1-Pentene | mol % | 0 | 0 | 0 | 0 |
| Hexane+ | mol % | 0.03 | 0 | 0 | 0.022 |
| N2 | mol % | 3.23 | 9 | 6.302 | 4.038 |
| O2 | mol % | 0 | 0.017 | 0 | 0 |
| CO | mol % | 0 | 2.146 | 20.852 | 5.486 |
| CO2 | mol % | 0.71 | 2.256 | 0.3 | 0.602 |
| H2O | mol % | 0 | 0 | 0.043 | 0.011 |
| Total | | 100.000 | 100.000 | 100.000 | 100.000 |
| Molecular weight | | 17.4 | 22.83 | 18.82 | 17.78 |
| Lower heating value BTU/ft$^3$ | | 916.36 | 1046.5 | 703.41 | 860.29 |

While the present invention has been described with reference to a preferred embodiment, as will occur to those skilled in the art, numerous changes, additions and omissions can be made without departing from the spirit and the scope of the present invention.

We claim:

1. A method of preparing and introducing fuel into combustors of a gas turbine, said method comprising:

introducing, into a catalytic partial oxidation reactor, a hydrocarbon containing feed stream comprising no less than about 15 percent by volume on a dry basis of hydrocarbons with at least two carbon atoms and/or at least about 3 percent by volume of olefins along with an oxygen containing stream and a steam stream so that a reactant mixture is obtained within the catalytic partial oxidation reactor, prior to contact with catalyst, having an oxygen to carbon ratio between about 0.08 and about 0.25 and a water to carbon ratio of between about 0.05 and about 0.5;

the hydrocarbon containing feed stream being introduced into the catalytic reactor alone or in combination with the steam stream at a temperature of no greater than about 600° C.;

reacting said reactant mixture within the catalytic partial oxidation reactor so that a product stream is produced at a temperature of between about 600° C. and about 860° C., the product stream having a hydrocarbon content consisting of methane, less than about 0.5 percent of olefins by volume on a dry basis, less than about 10 percent of alkanes with two or more carbon atoms on a dry basis and less than about 1 percent by volume on a dry basis of hydrocarbons other than methane, alkanes and olefins and a remaining content comprising hydrogen, carbon monoxide, carbon dioxide and water vapor;

cooling the product stream; and introducing the product stream into the combustors so that the product stream constitutes at least part of the fuel required to support combustion within the combustors.

2. The method of claim 1, wherein said hydrocarbon containing feed stream is an FCC offgas, a coker offgas, sweet refinery gas, or coke oven gas.

3. The method of claim 1, wherein a fuel stream is formed by combining the product stream, as a first fuel stream, with a second fuel stream, thereby to at least in part cool the product stream by direct heat exchange.

4. The method of claim 3, further comprising:
combining the hydrocarbon containing feed stream with the steam stream to form a combined stream;
introducing the combined stream into the catalytic partial oxidation reactor; and
indirectly transferring heat from the product stream to the combined stream, thereby to preheat the combined stream and to at least in part cool the product stream.

5. The method of claim 3, further comprising:
compressing an air stream to form the oxygen containing stream;
pumping a makeup water stream to form a pressurized water stream; and
quenching the product stream with the pressurized water stream.

6. The method of claim 3, further comprising producing the steam stream by pumping a makeup water stream to form a pressurized water stream and indirectly transferring heat from the product stream to the pressurized water stream within a heat exchanger, thereby to cool the product stream and to form the steam stream.

7. The method of claim 6, further comprising forming the oxygen containing stream by compressing an air stream to form a compressed air stream and indirectly transferring heat from the product stream to the compressed air stream, thereby preheating the compressed air stream and also cooling the product stream.

8. The method of claim 6, wherein the air stream is a bleed air stream from a compressor section of the gas turbine.

9. The method of claim 3, wherein the second fuel stream is natural gas.

10. The method of claim 1 or claim 2, wherein said combustors are lean premix combustors.

11. The method of claim 10, wherein each of said combustor has a primary mixing zone for mixing a fuel and compressor air to obtain a combustible mixture, a downstream secondary combustion zone for combusting the combustible mixture, primary fuel nozzles for feeding a primary fuel stream, constituting part of the fuel, to the primary mixing zone and a secondary fuel nozzle for introducing a secondary fuel stream, constituting a remaining part of the fuel, into the secondary combustion zone and downstream of the primary fuel nozzles to stabilize combustion.

12. The method of claim 11, wherein:
the product stream contains at least about 10 percent by volume hydrogen; and
the secondary fuel stream introduced by the secondary fuel nozzle constitutes the product stream.

13. The method of claim 12, wherein the product stream is cooled by:
pumping a makeup water stream to form a pressurized water stream;
quenching the product stream with the pressurized water stream; and
indirectly transferring heat from the product stream to the second fuel stream.

14. The method of claim 13, wherein the primary fuel stream is natural gas.

* * * * *